Jan. 8, 1935.  W. FRIEDEMANN  1,986,802
SAFETY DEVICE FOR POWER DRIVEN MEMBERS
Filed Dec. 11, 1933
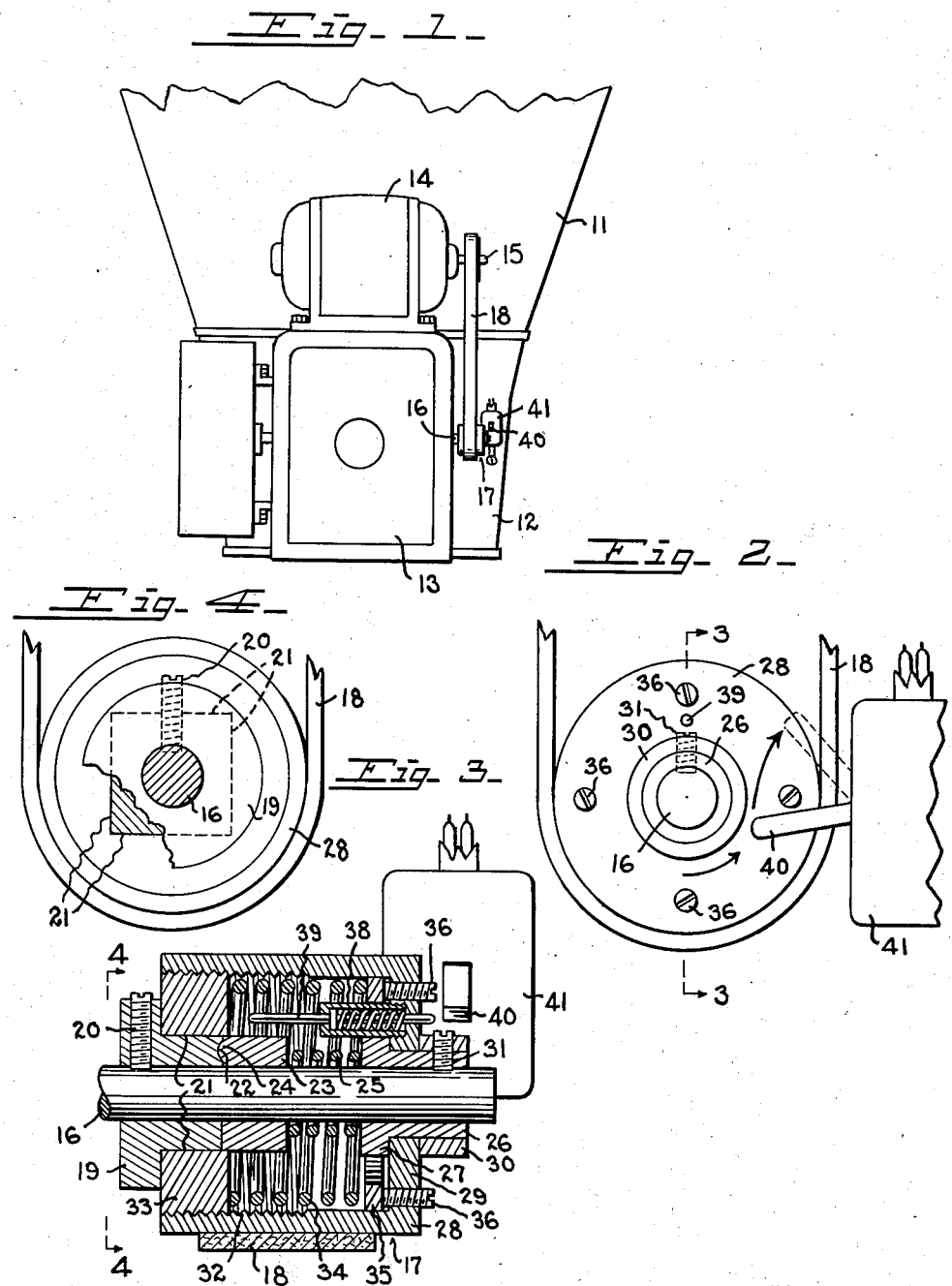
INVENTOR
WILLIAM FRIEDEMANN
BY
ATTORNEY Patented Jan. 8, 1935

1,986,802

UNITED STATES PATENT OFFICE 1,986,802

SAFETY DEVICE FOR POWER DRIVEN MEMBERS

William Friedemann, Cincinnati, Ohio

Application December 11, 1933, Serial No. 701,844

7 Claims. (Cl. 192—150)

My invention relates to a safety device primarily useful in connection with a driven member which may be subjected to excessive strain whereby upon such strain being applied to the driven member the safety device will function for tripping a switch and braking the electrical connection to the power driving member.

This construction is particularly useful in connection with stoker mechanism using a screw conveyor for feeding the fuel to the furnace retort. In such mechanism, foreign matter in the fuel or the fuel itself often causes the conveyor to jam and without a safety device often causes considerable damage to the mechanism.

The object of my invention is to provide means interposed between the driving member and the driven member which upon undue strain being applied to the driven member will cause the device to operate a switch for discontinuing the electrical energy to the motor. A further object is to provide a pulley having a threaded collar telescopically connected to the driven shaft and normally held in driving relation by means of spring tension. A further object is to provide a knock-out rod in the pulley arranged to be contacted by the threaded collar upon cessation of rotation of the driven shaft.

My invention will be further readily understood from the following description and claims and from the drawing, in which latter:

Fig. 1 is an end view of a stoker mechanism partly broken away.

Fig. 2 is an end view of the safety device.

Fig. 3 is a longitudinal section of the safety device taken in the plane of the line 3—3 of Fig. 2; and Fig. 4 is a section of the same taken in the plane of the line 4—4 of Fig. 3.

In the exemplification of my device I have shown it in conjunction with a stoker mechanism having a hopper 11 mounted on a base structure 12 and having a suitable speed regulating device confined within a housing 13 for imparting rotation to the conveyor. Suitably positioned relative to the housing 13 is an electric motor 14 for imparting rotation to the speed change mechanism. The rotor shaft 15 of the motor is provided with a pulley and a shaft 16 of the speed change mechanism is provided with a safety device 17. A belt 18 imparts rotation from the motor to the shaft 16. A collar 19 is suitably secured to the shaft 16 by a set screw 20 and is provided with a shank having square faces 21 and a depression 22 in the end thereof and a second collar 23 having square faces is provided with a lug 24 for reception in the recess 22 for normally maintaining the faces of the collar in alignment. A spring 25 normally maintains the collars 19 and 23 in rotative relation. A collar 26 having a flange 27 is secured to the shaft and provides positioning means for a housing 28, which is provided with an inwardly extending flange 29 received between the flange 27 and a collar 30. The collar 30 and the collar 26 are suitably secured to the shaft 16 as by a set screw 31. The housing 28 is provided with internal threads 32 in which a ring 33 is threadedly connected and provided with a square hole to form a sliding connection with the collars 19 and 23. A spring 34 is positioned between the ring 33 and an adjustable ring 35 in the housing for applying tension to the ring 33. The ring 35 is adjustable by means of a plurality of set screws 36 threaded into the flange 29 and butting the ring 35 for moving the ring toward or away from the ring 33, for increasing or decreasing the tension on the spring 34. A cap 38 is threaded into the flange 29 for forming a housing for a spring pressed rod 39 which extends through the flange 29 whereby the rod 39 upon contact by the ring 33 will move endwise into the path of a snap switch 40 of a switch box 41.

Under normal operating conditions the load will be carried by the tension of the spring 34 which will hold the parts in the relation shown in Fig. 3 making a solid driving unit, but when an obstruction occurs in the conveyor mechanism causing an undue load to be applied to the shaft 16, the housing will revolve about the ring 33 causing the ring to move inwardly against the tension of the spring 34 and contacting the rod 39 until said rod has engaged the snap switch 40 for throwing the snap switch into off position and stopping the motor thereby preventing damage to the conveyor mechanism. After the obstruction in the mechanism has been removed the housing can be rotated to cause the ring 33 to move outwardly into normal operating position. The switch can then be thrown to again start the motor for operation of the device. When the ring 33 moves inwardly it moves off of the collar 19 onto the collar 23 in which position the housing can rotate freely without imparting any rotation to the shaft 16, thus preventing an undue strain on the motor which can come to a gradual stop.

Having thus fully described my invention, what I claim as new and desire to secure by Letters Patent, is:

1. A driving member, a driven member, driving means interposed between said members having threaded connection with said driving member and movable out of driving relation upon cessation of rotation of said driven member.

2. A driving member, a driven member, a ring having threaded connection with said driving member, a collar on said driven member, said ring slidable on said collar, and movable out of driving relation upon cessation of rotation of said driven member, tension means between said driving member and said ring for normally maintaining said members in rotative relation.

3. A driving member, a driven member, a ring having threaded connection with said driving member, a collar on said driven member, said ring forming a driving connection between said members and slidable on said collar for releasing said driving connection, a plunger on said driving member in the path of said movable ring, tension means between said driving member and said ring for normally maintaining said members in rotative relation.

4. A driving member, a driven member, a ring having threaded connection with said driving member, a collar on said driven member, said ring forming a driving connection between said members and slidable on said collar for releasing said driving connection, a plunger on said driving member in the path of said movable ring for normally maintaining said members in rotative relation and a switch operated by said plunger.

5. A driving member, a driven member, means for imparting rotation from said driving member to said driven member comprising a ring having threaded connection with said driving member and normally rotatively secured to said driven member, a plunger in said driving member engaged by the movement of said ring out of driving relation upon cessation of rotation of said driven member.

6. A driving member, a driven member, a ring having threaded connection with said driving member, tension means for normally maintaining said ring in driving relation, means for adjusting said tension, a plunger in said driving member operable by the endwise movement of said ring out of driving relation upon cessation of rotation of said driven member.

7. A driving member, a driven member, a ring having threaded connection with said driving member, tension means for normally maintaining said ring in driving relation, means for adjusting said tension, a plunger in said driving member operable by the endwise movement of said ring out of driving relation upon cessation of rotation of said driven member, and a switch in the path of said plunger for disconnecting the motive force to said driving member.

WILLIAM FRIEDEMANN.